(12) United States Patent
Kwon et al.

(10) Patent No.: US 11,785,561 B2
(45) Date of Patent: Oct. 10, 2023

(54) DIGITAL CHANNELIZER WITH PREDISTORTER, HIGH-POWER AMPLIFIER, AND BEAMFORMING

(71) Applicant: Wichita State University, Wichita, KS (US)

(72) Inventors: Hyuck M. Kwon, Wichita, KS (US); Madhuprana Goswami, Wichita, KS (US); Vidhi Rana, Wichita, KS (US); Khanh Pham, Albuquerque, NM (US)

(73) Assignee: WICHITA STATE UNIVERSITY, Wichita, KS (US)

( * ) Notice: Subject to any disclaimer, the term of this patent is extended or adjusted under 35 U.S.C. 154(b) by 23 days.

(21) Appl. No.: 17/361,962

(22) Filed: Jun. 29, 2021

(65) Prior Publication Data

US 2022/0007311 A1  Jan. 6, 2022

Related U.S. Application Data

(60) Provisional application No. 63/047,043, filed on Jul. 1, 2020.

(51) Int. Cl.
| | |
|---|---|
| *H04W 52/52* | (2009.01) |
| *H04B 7/185* | (2006.01) |
| *H04B 7/19* | (2006.01) |
| *H04W 52/24* | (2009.01) |

(Continued)

(52) U.S. Cl.
CPC .............. *H04W 52/52* (2013.01); *H04B 1/59* (2013.01); *H04B 7/18517* (2013.01); *H04B 7/19* (2013.01); *H04B 7/2621* (2013.01); *H04W 52/243* (2013.01)

(58) Field of Classification Search
CPC ...... H04W 52/52; H04W 52/243; H04B 1/59; H04B 7/18517; H04B 7/19; H04B 7/2621; H04B 7/18513; H04B 7/18515
See application file for complete search history.

(56) References Cited

U.S. PATENT DOCUMENTS

| | | | |
|---|---|---|---|
| 2018/0175978 A1* | 6/2018 | Beidas | H04L 25/03834 |
| 2021/0175962 A1* | 6/2021 | Li | H03F 1/3241 |

OTHER PUBLICATIONS

Goswami et al. "Satellite Digital Channelizer with Predistorted High-Power Amplifier," Nov. 14, 2019, IEEE.*

* cited by examiner

*Primary Examiner* — Jae Y Lee
(74) *Attorney, Agent, or Firm* — Stinson LLP

(57) ABSTRACT

A satellite communications system is disclosed, the system comprising a ground controller, a decode-and-forward (DF) satellite transponder, and a digital high-power amplifier (HPA). The DF is further comprised of a transponder front end including a digital channelizer and a predistorter. The ground controller is configured to transmit multiple-access frequency-division-multiplexed signals to the DF, where the DF is configured to down-convert the signals received at the transponder front end. The digital channelizer is configured to convert the signals received into a single sample steam and feed the stream through the predistorter into the single digital HPA, wherein the HPA is configured to amplify each input sample of the stream in sample-by-sample fashion and generates a discrete output. The DF is further configured to convert the output of the digital HPA to a continuous time signal and up-convert the output with a main carrier frequency for down-link transmission to multiple-access ground users.

5 Claims, 4 Drawing Sheets

(51) Int. Cl.
*H04B 7/26* (2006.01)
*H04B 1/59* (2006.01)

DIGITAL CHANNELIZER WITH PREDISTORTER, HIGH-POWER AMPLIFIER, AND BEAMFORMING

CROSS-REFERENCE TO RELATED APPLICATION

The present application claims priority to the U.S. Provisional Patent Application No. 63/047,043, filed on Jul. 1, 2020, which is hereby incorporated by reference.

STATEMENT REGARDING FEDERALLY SPONSORED RESEARCH OR DEVELOPMENT

This invention was made with government support under Grant No. FA9453-18-1-0102 awarded by Air Force Research Lab. The government of the United States has certain rights in the invention. The invention described herein may be manufactured and used by or for the Government of the United States for all government purposes without the payment of any royalty.

FIELD

The present disclosure generally relates to transmitting signals to from a ground controller to satellites using a high-power amplifier and digital channelizer.

BACKGROUND

Digital beamforming (BF), or precoding, has been applied recently for terrestrial communications. In addition, mathematical and simulation models to improve satellite communication on-the-move operating in the X band, Ku band, and Ka band have been developed. A geostationary earth orbit satellite requires high transmitting power (e.g., 20 dBW=100 watts) because the waveform travelling distance can be more than 36,000 km. Thus, it is necessary to operate close to the saturation point in an analog high-power amplifier (HPA), thereby causing undesirable intermodulation (IM) and nonlinear impairments when multiple-accesses subband signals of different subcarriers are simultaneously transmitted. Specifically, this occurs when multiple access user (MAU) frequency-division (FD) subband signals are summed and fed into an analog HPA. Consequently, undesirable IM products are generated at the HPA output, thereby causing non-negligible system performance degradation.

SUMMARY

The present disclosure discloses a digital HPA instead of an analog HPA. Today, a digital channelizer can convert the sample stream of multiple-access subband user signals into a single sample stream before an HPA with no overlapping in samples, thereby reducing the intermodulation products significantly. This disclosure further discloses a digital channelizer for multiple-access user subband signals combined with a nonlinear HPA and a simple predistorter (PD). Both phase and amplitude predistortion can compensate almost perfectly for the distortion due to the HPA's nonlinear characteristics. Simulation results verify an almost negligible bit error rate (BER) degradation. Therefore, a satellite communication systems using the proposed digital channelizer, PD, and digital HPA can have high-frequency utilization efficiency, multicast and broadcast capabilities, and gain control for each subchannel.

In one aspect, a satellite communications system comprises a ground controller, a decode-and-forward satellite transponder, and a digital high-power amplifier. The decode-and-forward satellite is also comprised of a transponder front end including a digital channelizer and a predistorter. The ground controller is configured to transmit multiple-access frequency-division-multiplexed signals to the decode-and-forward satellite transponder, where the decode-and-forward satellite transponder is configured to down-convert the signals received from the ground controller at the transponder front end. The digital channelizer is configured to convert the signals received from the ground controller into a single sample stream and feed the single sample stream through the predistorter into the single digital high-power amplifier. The single digital high power amplifier is configured to amplify each input sample of the sample stream in sample-by-sample fashion and generate a discrete output. The decode-and-forward satellite transponder is then configured to convert the output of the digital high power amplifier to a continuous time signal and up-convert the output with a main carrier frequency for down-link transmission to multiple-access ground users.

Other objects and features of the present disclosure will be in part apparent and in part pointed out herein.

BRIEF DESCRIPTION OF THE DRAWINGS

Corresponding reference numbers indicate corresponding parts throughout the drawings.

DETAILED DESCRIPTION

Figure 1:
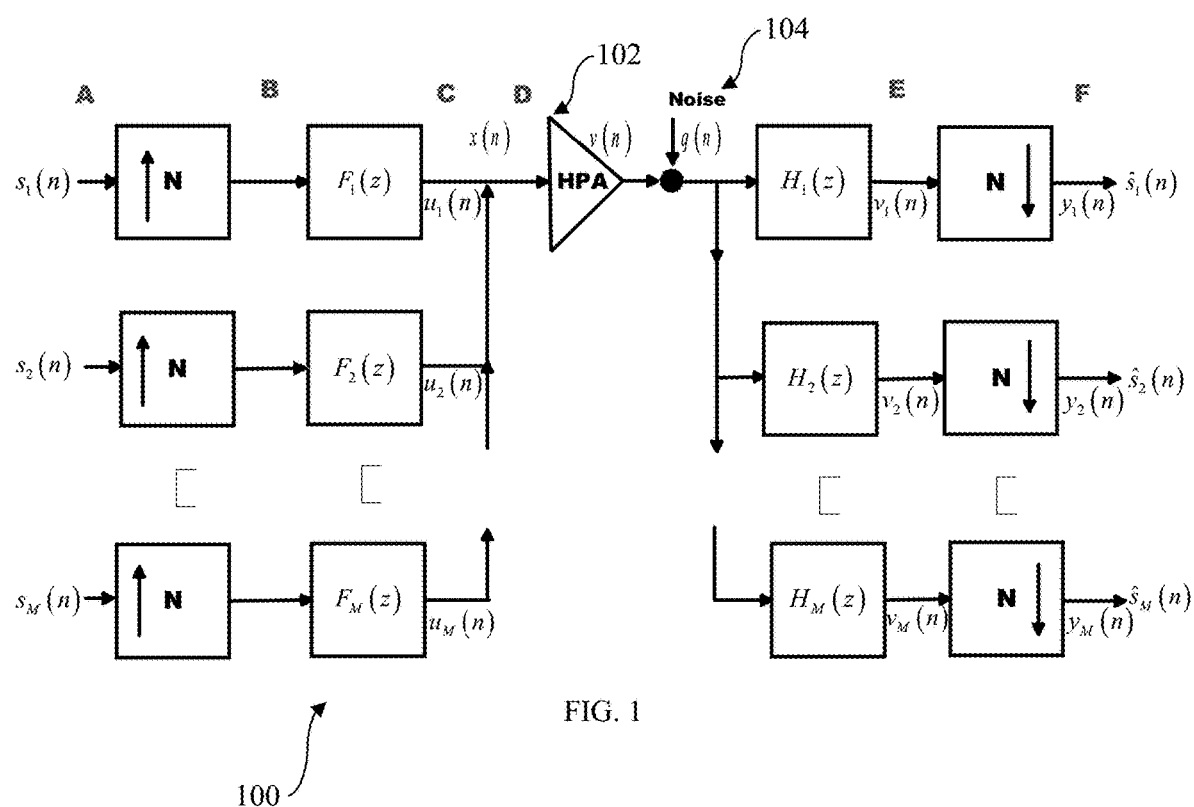
FIG. 1 is a schematic of a multi-user digital channelizer model with an HPA.

In the present disclosure, a digital channelizer for multiple access user (MAU) frequency-division (FD) signals is disclosed. Throughout the disclosure, the term "digital" refers to the discrete time sample with an infinite quantization level. Nothing in this disclosure, however, should be construed to limit the application of the disclosure, as a finite quantization could be used.

A digital channelizer up-sampler at a satellite transmitter can convert MAU digital input signals into a single sample stream carrying multiple subband digital signals with no overlap in time. The digital channelizer down-sampler at a receiver is also capable of converting the MAU back into multiple-user output signals and selecting the desired user signal. Therefore, a digital channelizer can map multiple-access input signals effectively into multiple subband channels with no distortion. A digital channelizer using multiple polyphaser bandpass filter banks is equivalent to a multi-channel digital transmitter that simultaneously up-converts a number of baseband signals into a set of frequency-division-multiplexed (FDM) channels. Similarly, a multichannel receiver simultaneously down-converts a set of FDM channels using polyphaser bandpass filter banks.

The digital channelizer may also be used for a digital satellite communication system design. Multi-access FDM-like signals can be transmitted from a ground controller to a decode-and-forward (DF) satellite transponder. The transponder comprises a front end, the front end including a digital channelizer and a predistorter, which down-converts its received signal into multiple baseband signals. Then the digital channelizer, located at the transponder front end before a predistorter (PD), converts the multiple-access baseband signals into a single sample stream and feeds it into a single digital high-power amplifier (HPA) before the satellite down-link transmission. The HPA is configured to amplify each input sample of the sample stream in a sample-by-sample fashion and generates a discrete output. A digital HPA means that its input and output are discrete in time. Multiple HPAs are not necessary to amplify the multiple-access signals individually because the digital channelizer output is a single sample stream. The digital HPA amplifies each input sample in a sample-by-sample way. Then the discrete output of the HPA is converted to a continuous time signal and up-converted with a main carrier frequency for a down-link transmission from the transponder to multiple-access ground users.

Due to a long waveform traveling distance in a Sat-Com link, it is necessary to operate close to the saturation point in an HPA, thereby causing undesirable intermodulation and nonlinear impairments when the sum of multiple-access subband analog signals are fed into a conventional analog without digital channelizer processing. The HPA intermodulation and nonlinear impairments can be avoided using the proposed predistorter combined with a digital channelizer.

The conventional Saleh's memoryless high-power traveling-wave tube amplifier (TWTA) model is used in this disclosure because Saleh's HPA is memoryless and exhibits nonlinear distortions in both amplitude (i.e., amplitude-to-amplitude or AM-to-AM conversion) and phase (i.e., amplitude-to-phase or AM-to-PM conversion) at a given sample time. The proposed PD scheme takes the sample x(n) from a digital channelizer output stream and computes two variables: an amplitude PD variable and a phase PD variable. These two variables are designed so that the overall HPA output with the proposed PD has zero phase distortion and the same amplitude as the HPA output for the no PD case for any given input sequence x(n). Saleh's HPA AM-AM and AM-PM characteristics are used to compute the two variables. The numerical results demonstrate that the proposed PD can compensate for the HPA nonlinear impairments almost perfectly, even when the multi-user digital channelizer output signal inputs to the PD followed by the HPA. The proposed PD method does not use any look-up tables, and hence its complexity is simpler than any existing PD methods. This is because the PD method computes only two simple equations, discussed below. The proposed PD method is configured to receive each single sample stream from the digital channelizer output and computes how much phase and amplitude should be overcompensated for in each single sample stream so that the output of the digital HPA may have the same amplitude as the no PD case and zero phase distortion after the HPA. These pre-compensation values are computed for each input sample amplitude by using known HPA AM-AM and AM-PM characteristics. The amplitude variable and phase variable are selected so that the discrete output of the HPA has zero phase distortion.

This is feasible because the input and output of a digital HPA are samples and there is no memory in a digital HPA. If the digital PD can make the digital HPA amplitude including PD equal to that of the HPA of no PD, and if the digital PD can make the overall phase distortion from the digital PD to the digital HPA to be zero, then the output of the digital HPA will show no IM products. This is because only one sample input is fed into the digital HPA for one sample output. No sum of samples coming from different subband signals are fed into the digital HPA. Furthermore, the frequency component of each sample is already separated from adjacent samples in the frequency domain by using the bandpass filters (BPFs), and therefore no intra-sample or inter-sample interference will be experienced from a sample to a next sample.

In addition, the distortion from the PD input to the HPA output is negligible. The overall distortion from the digital channelizer transmitter input to the digital channelizer transmitter receiver output, including practical transmit and receive BPFs, PD, and HPA under an additive white Gaussian noise (AWGN) environment, is negligible. In other words, the overall bit error rate (BER) versus the bit-energy-to-noise-power-spectral-density ratio $E_b/N_0$ curve for the proposed scheme shows the same theoretical BER for the considered 8-ary phase-shift keying (8PSK) modulation under the same AWGN environment when the theoretical system assumes no digital channelizer, no BPFs, no PD, and no HPA. The overall degradation is negligible. Therefore, a satellite communication system transponder configured under the AWGN environment using the proposed digital channelizer, PD, and digital HPA can have high-frequency utilization efficiency, multicast and broadcast capabilities, and can gain control for each subchannel.

A phase array antenna (PAA) beamforming (BF) is also implemented with the digital channelizer, PD, and HPA. The BER curve for the proposed digital channelizer with pre-distorted HPA shows that the BER is 14 dB better than that of the BER for the considered 8-PSK modulation under the AWGN environment when no BF is involved and when the theoretical system assumes no digital channelizer, no BPFs, no BFs, no PD, and no HPA. This is due to the fact that five antenna elements are used per each MAU, and the PAA power gain is 14 dB.

The proposed digital channelizer further does not expand the bandwidth (BW) compared to the frequency-division-multiplexed channel with no digital channelizer. If the FDM channel with no digital channelizer requires a bandwidth equal to the number of MAU multiplied by hertz (Hz) (i.e., BW per user), then the proposed digital channelizer also requires the same BW because it can employ the up-samplers at a rate equal to the number of MAUs multiplied by the original complex value sampling rate (Hz) per user. Therefore, a satellite communication system using the proposed digital channelizer, PD, digital HPA, and PAA BF can have high-frequency utilization efficiency, and multicast and broadcast capabilities, and can gain control for each sub-channel. PAA BF technology will help the receivers with an improved signal quality.

The inventors believe that they have, for the first time, recognized the feasibility of a digital channelizer application for a digital satellite transponder to communicate multiple-access subband user signals via a nonlinear HPA and a simple predistorter under an AWGN environment as discussed herein. The same conclusion, i.e., negligible overall BER degradation when BF is not involved and approximated 14 dB BER improvement when BF is involved, can be expected under the other practical satellite channel environments (i.e., a Rician fading channel).

Figure 2:
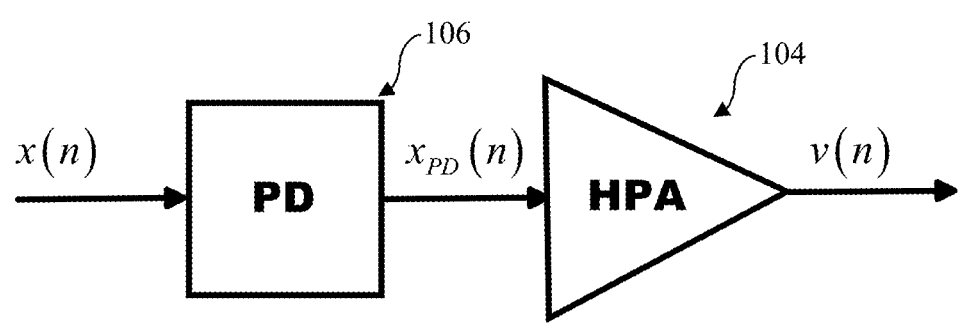
FIG. 2 is a schematic of a predistorter coupled with an HPA.

Referring to FIG. 1, the overall system block diagram for a multi-user digital channelizer 100 with an HPA 102 under AWGN, where the noise vector 104 is denoted by "q". Referring to FIG. 2, the PD 106 can be placed just before the HPA 102. N denotes the up-sampling and down-sampling factors, while M denotes the number of channels or the number of subband users. For a practical communication system, N>M should be satisfied. As the ratio N/M increases, the bandwidth allocation of each subband user signal decreases, but the interference from the neighboring subband user signal decreases. In other words, the ratio N/M can control the bandwidth efficiency versus the performance degradation due to the neighborhood subband signal interference. Vector $s_k$ of a data block size denotes the 8-PSK modulated input symbol vectors for each user k=1 to M.

At the transmitter in the decode-and-forward (DF) transponder, the up-sampled input signal is passed through the transmit BPF's with z-transfer function $F_k(z)$ for each user subband signal, k=1 to M. This system is called a synthesis filter bank because it combines a set of signals $u_k$ into a single sample stream sequence signal x(n) and works as a polyphase filter bank.

At the receiver, an analysis filter bank is used because it splits the single stream signal vector v, which is the output of the HPA 102, into M individual components for M channels, denoted by $v_k$. The analysis filter z-transfer function is denoted by $H_k(z)$, for k=1 to M receiver channels. Demodulated symbols are denoted by $s_k(n)$ for k=1 to M receivers and are obtained after demodulating the down-sampled signal vector $y_k$.

As shown in FIG. 2, $x_{PD}(n)$ denotes the PD 106 output at sample time n and is the input to the HPA 102. The $x_{PD}(n)$ is a function of the amplitude $A_{PD}(x(n))$ for the input x(n) and phase predistortion output $P_{PD}(x(n))$. The amplitude predistortion factor, $A_{PD}(x(n))$, and the phase predistortion factor, $P_{PD}(x(n))$, can be calculated using the equations:

$$A_{PD}((x_n)) = \frac{\alpha_a + \sqrt{\alpha_a^2 - 4\beta_a c^2 |x(n)|^2}}{2|x(n)|^2 \beta_a c} \quad (1)$$

$$P_{PD}(x(n)) = -\frac{\alpha_p |x(n) A_{PD}(x(n))|^2}{1 + \beta_p |x(n) A_{PD}(x(n))|^2} \quad (2)$$

Where $\alpha_a=2$, $\beta_a=1$, $\alpha_p=4$, and $\beta_p=9$ from the Saleh's HPA AM-AM and AM-PM characteristics. For a given input sample x(n), we can compute the HPA amplification slope c from Saleh's AM-AM characteristics, then the PD compensation amplitude factor $A_{PD}(x(n))$ from (1), and then the PD phase compensation factor $P_{PD}(x(n))$ from (2). The results from simulation show that the PD satellite communication system is configured to use the phase predistortion factor as obtained through (1) and (2) to compensate for the nonlinearity effect due to the HPA almost perfectly for any input symbol x(n) at time n, even for the |x(n)|>1 case.

EXAMPLES

Figure 3:
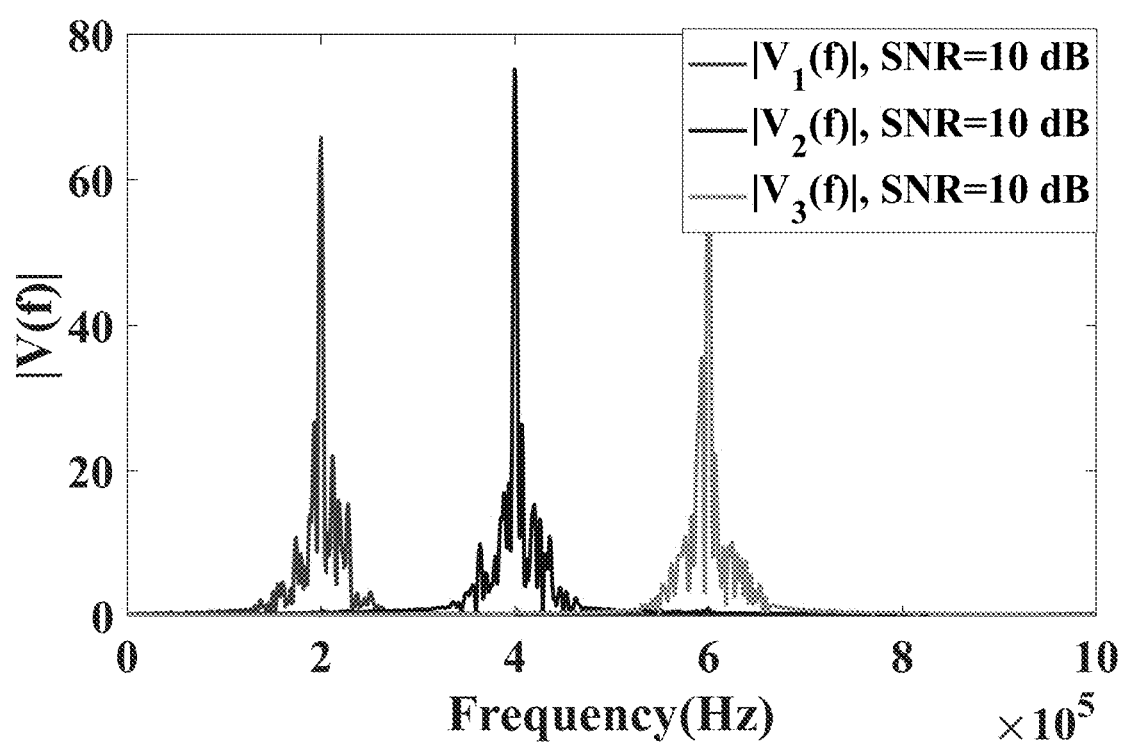
FIG. 3 is a graph of the frequency spectrum at step E of FIG. 1 under AWGN noise.

For demonstrating the inventors proposed multi-user digital channelizer with HPA 102 and PD 106, the inventors used $n_{total}$=200 samples and 4 symbols, so that the inventors had 50 samples per symbol and applied 8-PSK modulation under AWGN noise. The combined (i.e., polyphased) signal x(n) is passed through the PD and HPA, and then transmitted through the AWGN channel. The receiver side has a set of analysis filter banks that split the predistorted output signal from the HPA v into M components for each user k receiver processing using the M polyphase channels. The spectrum at the output of these analysis filters at step E of FIG. 1 can be seen in FIG. 3. Each of the filters in the analysis filter bank is designed using MATLAB Remez BPFs of order 39, similar to the polyphaser filter design, which uses a much higher filter order, such as 200. These down-sampled signals are demodulated to obtain the received symbol vectors $\hat{s}_k$.

Figure 4:
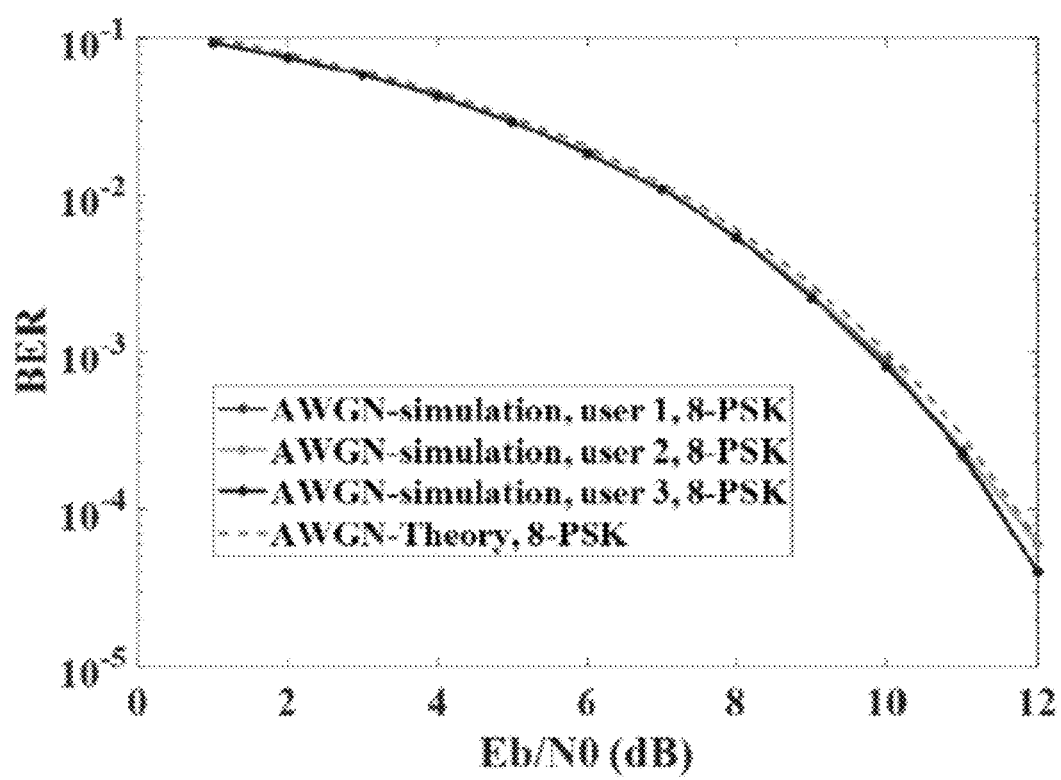
FIG. 4 is a graph of the BER calculation under AWGN channel, 8-PSK modulation for the digital channelizer model with HPA predistortion.

Referring to FIG. 4, a plot of the bit error rate by comparing the transmitted and demodulated symbols at the receiver for $10^5$ symbols and $n_{total}=5 \times 10^6$ samples. When m=50 samples per symbol, the signal-to-noise ratio (SNR) is m times higher than the SNR of the one-sample-per-symbol case, if each noise sample in the multi-sample-per-symbol case has the same variance as the one-sample-per-symbol case. Therefore, the each noise sample magnitude is increased by multiplying it by $\sqrt{m}$. This is because the variance of the sample average noise with m samples per symbol becomes m times smaller as $\sigma_N^2 = N_0/m$, where $N_0$ denotes the one-sided AWGN power spectral density, which is equal to the noise variance of the one-sample-per-symbol case. In order to obtain the same BER results as that of the theory under an ideal AWGN channel, the noise variance of the one-sample-per-symbol case must be multiplied by factor m for the multiple samples per symbol case. In FIG. 4, the simulated BER curve under the AWGN channel for each user agrees almost perfectly with that of the theoretical BER under AWGN. Thus, the simulation results and theoretical analysis show that the proposed PD method removes the nonlinear impairments due to HPA almost perfectly, and degradation by using the digital channelizer is negligible.

In summary, the proposed PD tests whether the input amplitude |x(n)| is less than or equal to 1. If the answer to this is yes, then c is computed using Saleh's AM-AM characteristics. Otherwise, the proposed PD sets the output amplitude multiplied to c=1, i.e., no amplification. This is because the HPA reduces the amplitude when c>1. Still the PD applies the PD phase restoration in formula (2).

The theoretical analysis and numerical results of the inventors conclude that the proposed predistortion method can restore, almost perfectly, both the amplitude and phase distortion due to the HPA. In addition, for the first time the multi-user digital channelizer system model with HPA and predistortion together was introduced, and observed that the digital polyphaser channelizer can be useful from a digital satellite design. This is because the input to the digital HPA is coming from only a single subband user signal sample at a given sample time n with no overlapping with other subband user samples, and hence the intermodulation products that appear in the analog HPA can be avoided completely. In addition, the phase can be compensated and the amplitude distorted due to the transmit and receive filters cab be restored almost perfectly because these filters are known. Both filter and HPA PD compensation can restore the overall distortion almost perfectly and can achieve almost the same BER as the theoretical BER under the AWGN channel. The multi-user digital channelizer with the digital HPA predistortion method can remove nonlinear distortions and can support the multiple subband user signals almost perfectly.

When introducing elements of aspects of the invention or the embodiments thereof, the articles "a," "an," "the," and "said" are intended to mean that there are one or more of the elements. The terms "comprising," "including," and "having" are intended to be inclusive and mean that there may be additional elements other than the listed elements.

Not all of the depicted components illustrated or described may be required. In addition, some implementations and embodiments may include additional components. Variations in the arrangement and type of the components may be made without departing from the spirit or scope of the claims as set forth herein. Additional, different or fewer components may be provided and components may be combined. Alternatively, or in addition, a component may be implemented by several components.

The above description illustrates the aspects of the invention by way of example and not by way of limitation. This description enables one skilled in the art to make and use the aspects of the invention, and describes several embodiments, adaptations, variations, alternatives and uses of the aspects of the invention, including what is presently believed to be the best mode of carrying out the aspects of the invention. Additionally, it is to be understood that the aspects of the invention are not limited in its application to the details of construction and the arrangement of components set forth in the following description or illustrated in the drawings. The aspects of the invention are capable of other embodiments and of being practiced or carried out in various ways. Also, it will be understood that the phraseology and terminology used herein is for the purpose of description and should not be regarded as limiting.

It will be apparent that modifications and variations are possible without departing from the scope of the invention defined in the appended claims. As various changes could be made in the above constructions and methods without departing from the scope of the invention, it is intended that all matter contained in the above description and shown in the accompanying drawings shall be interpreted as illustrative and not in a limiting sense.

In view of the above, it will be seen that several advantages of the aspects of the invention are achieved and other advantageous results attained.

The Abstract and Summary are provided to help the reader quickly ascertain the nature of the technical disclosure. They are submitted with the understanding that they will not be used to interpret or limit the scope or meaning of the claims. The Summary is provided to introduce a selection of concepts in simplified form that are further described in the Detailed Description. The Summary is not intended to identify key features or essential features of the claimed subject matter, nor is it intended to be used as an aid in determining the claimed subject matter.

What is claim is:
1. A satellite communications system comprising:
a ground controller;
a decode-and-forward satellite transponder having a transponder front end including a digital channelizer and a predistorter; and
a digital high-power amplifier;
wherein the ground controller is configured to transmit multiple-access frequency-division-multiplexed signals to the decode-and-forward satellite transponder;
wherein the decode-and-forward satellite transponder is configured to down-convert the signals received from the ground controller at the transponder front end;
wherein the digital channelizer is configured to convert the signals received from the ground controller into a single sample stream and feed the single sample stream through the predistorter into the single digital high-power amplifier;
wherein the single digital high power amplifier is configured to amplify each input sample of the sample stream in sample-by-sample fashion and generate a discrete output; and
wherein the decode-and-forward satellite transponder is configured to convert the output of the digital high power amplifier to a continuous time signal and up-convert the output with a main carrier frequency for down-link transmission to multiple-access ground users.

2. The satellite communication system as set forth in claim 1, wherein the predistorter is configured to receive the single sample stream and compute an amplitude variable and a phase variable.

3. The satellite communication system as set forth in claim 2, wherein the amplitude variable and the phase variable are selected so that the discrete output of the high power amplifier has zero phase distortion.

4. The satellite communication system as set forth in claim 3, wherein the predistorter is configured to compensate for nonlinearity in the high power amplifier.

5. The satellite communication system as set forth in claim 4, wherein the transponder is configured to communicate under an additive white Gaussian noise environment.

* * * * *